(12) United States Patent
Kim et al.

(10) Patent No.: US 11,204,876 B2
(45) Date of Patent: Dec. 21, 2021

(54) METHOD AND APPARATUS FOR CONTROLLING MEMORY USING PREFETCH INFORMATION

(71) Applicant: ELECTRONICS AND TELECOMMUNICATIONS RESEARCH INSTITUTE, Daejeon (KR)

(72) Inventors: Byung Jo Kim, Sejong-si (KR); Joo Hyun Lee, Daejeon (KR); Seong Min Kim, Sejong-si (KR); Ju-Yeob Kim, Daejeon (KR); Jin Kyu Kim, Incheon (KR); Mi Young Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 16/953,242

(22) Filed: Nov. 19, 2020

(65) Prior Publication Data

US 2021/0157734 A1    May 27, 2021

(30) Foreign Application Priority Data

Nov. 27, 2019  (KR) ........................ 10-2019-0154557

(51) Int. Cl.
*G06F 12/08*    (2016.01)
*G06F 12/0862*  (2016.01)
*G06N 3/063*    (2006.01)
*G06F 13/16*    (2006.01)
*G06F 12/02*    (2006.01)

(52) U.S. Cl.
CPC ...... *G06F 12/0862* (2013.01); *G06F 12/0238* (2013.01); *G06F 13/1673* (2013.01); *G06N 3/063* (2013.01)

(58) Field of Classification Search
None
See application file for complete search history.

(56) References Cited

U.S. PATENT DOCUMENTS

| 5,941,981 | A | 8/1999 | Tran |
| 6,516,389 | B1 * | 2/2003 | Uchihori ............. G06F 12/0862 711/113 |
| 10,049,322 | B2 | 8/2018 | Ross |
| 2002/0078061 | A1 * | 6/2002 | Wong .................. G06F 12/0862 |
| 2007/0204108 | A1 * | 8/2007 | Griswell ............. G06F 12/0862 711/137 |

(Continued)

FOREIGN PATENT DOCUMENTS

KR    10-2017-0126999 A    11/2017

*Primary Examiner* — Tracy C Chan
(74) *Attorney, Agent, or Firm* — Rabin & Berdo, P.C.

(57) ABSTRACT

A method for controlling a memory from which data is transferred to a neural network processor and an apparatus thereof are provided, the method including: generating prefetch information of data by using a blob descriptor and a reference prediction table after history information is input; reading the data in the memory based on the pre-fetch information and temporarily archiving read data in a prefetch buffer; and accessing next data in the memory based on the prefetch information and temporarily archiving the next data in the prefetch buffer after the data is transferred to the neural network from the prefetch buffer.

14 Claims, 9 Drawing Sheets

(56) References Cited

U.S. PATENT DOCUMENTS

| | | |
|---|---|---|
| 2016/0078863 A1 | 3/2016 | Chung et al. |
| 2017/0102940 A1 | 4/2017 | Henry et al. |
| 2017/0140245 A1* | 5/2017 | Kraft .................... G06K 9/0063 |
| 2017/0330086 A1 | 11/2017 | Doh et al. |
| 2018/0060362 A1* | 3/2018 | Chidambaran ..... G06F 16/2219 |
| 2018/0300601 A1* | 10/2018 | Cedola .................... G06N 3/08 |
| 2019/0004954 A1* | 1/2019 | Kumar ................ G06F 12/0246 |
| 2021/0081323 A1* | 3/2021 | Mclellan ............ G06F 12/0893 |

* cited by examiner

METHOD AND APPARATUS FOR CONTROLLING MEMORY USING PREFETCH INFORMATION

CROSS-REFERENCE TO RELATED APPLICATION

This application claims priority to and the benefit of Korean Patent Application No. 10-2019-0154557 filed in the Korean Intellectual Property Office on Nov. 27, 2019, the entire contents of which are incorporated herein by reference.

BACKGROUND OF THE INVENTION

(a) Field of the Invention

The present disclosure relates to a method and an apparatus for controlling memory using prefetch information.

(b) Description of the Related Art

Convolutional neural network (CNN) is a class of artificial neural networks, which simulate visual information processing of the optic nerve structure of humans. The CNN can increase the accuracy of visual perception by effectively learning model parameters using a convolution layer and a pooling layer.

In the hardware implementation of CNN, the problems of reducing size of the model parameters and the computation data and effective reading/writing from memory are to be solved. In order to solve these problems, there was a technical approach to reduce the data size of the neural networks using neural network compression techniques such as pruning and quantization. These compression technologies allow the synaptic parameters of the neural network to be sparse and greatly reduced in size. In addition, the compression technologies reduce MAC computations of the neural network, thereby enabling low power design.

However, in order to perform MAC operation using sparse synaptic parameters and sparsity, discontinuous memory address control is inevitable. Using a simple memory control apparatus of the prior art, the atypical and discontinuous memory reading and writing method delays the high-speed data processing of the sparse compressed neural network operator, which makes it difficult to process a large amount of data in real time.

SUMMARY OF THE INVENTION

An exemplary embodiment provides a method for controlling a memory from which data is transferred to a neural network processor.

Another exemplary embodiment provides an apparatus for controlling a memory from which data is transferred to a neural network processor.

Yet another exemplary embodiment provides a system for operating a neural network.

According the exemplary embodiment, the method for controlling a memory from which data is transferred to a neural network processor includes: generating prefetch information of data by using a blob descriptor and a reference prediction table after history information is input; reading the data in the memory based on the pre-fetch information and temporarily archiving read data in a prefetch buffer; and accessing next data in the memory based on the prefetch information and temporarily archiving the next data in the prefetch buffer after the data is transferred to the neural network from the prefetch buffer.

The prefetch information may include first prefetch information about a source address of the data and a size of the data and second prefetch information about a source address of the next data and a size of the next data.

The reading the data in the memory based on the prefetch information and temporarily archiving read data in a prefetch buffer may include reading the data in the memory based on the source address in the first prefetch information.

The method may further include storing, after data updated based on operation using the data is archived in the prefetch buffer, updated data in the memory according to a source address of the data.

According to another exemplary embodiment, the apparatus for controlling a memory from which data is transferred to a neural network processor includes: a synapse correlation table configured to include a reference prediction table used for generating prefetch information of data in cooperation with a blob descriptor after history information is input; a low level memory controller configured to read the data in the memory based on the prefetch information and read next data following the data in the memory based on the prefetch information; and a prefetch buffer configured to temporarily store the data until the data read by the low level memory controller is transferred to the neural network processor and temporarily store the next data after the data is transferred to the neural network processor.

The prefetch information may include first prefetch information about a source address of the data and a size of the data and second prefetch information about a source address of the next data and a size of the next data.

The low level memory controller may be specifically configured to read the data in the memory based on the source address of the data included in the first prefetch information and read the next data in the memory based on the source address of the next data included in the second prefetch information.

The prefetch buffer may include a read buffer and a write buffer and the prefetch buffer may be configured to temporarily store the data in the read buffer and store the next data in the read buffer after the data is transferred to the neural network processor.

The prefetch buffer may be further configured to temporarily store, when data updated based on operation using the data is received from the neural network processor, updated data in the write buffer.

The low level memory controller may be further configured to store, when the updated data is temporarily stored in the write buffer, the updated data in the memory according to a target address corresponding to the source address of the data.

According to yet another exemplary embodiment, a system for operating a neural network includes: a neural network processor including a plurality of MAC operator, a memory, and a memory controller configured to transfer data stored in the memory to the neural network processor and store data updated by the neural network processor in the memory, wherein the memory controller is configured to generate prefetch information of data by using a synapse correlation table and a blob descriptor based on history information, read the data in the memory based on the prefetch information, and read next data following the data in the memory based on the prefetch information for next operation of the neural network processor while the data is used by the neural network processor.

The prefetch information may include first prefetch information about a source address of the data and a size of the data and second prefetch information about a source address of the next data and a size of the next data.

The memory controller may be further configured to access the source address of the data included in the first prefetch information to transfer the data to the neural network processor and access the source address of the next data included in the second prefetch information to transfer the next data to the neural network processor.

The memory controller may be further configured to store the updated data in the memory according to a target address corresponding to the source address of the data when the updated data is archived in a prefetch buffer.

DETAILED DESCRIPTION OF THE EMBODIMENTS

In the following detailed description, only certain exemplary embodiments have been shown and described, simply by way of illustration. As those skilled in the art would realize, the described embodiments may be modified in various different ways, all without departing from the spirit or scope of the embodiment. Accordingly, the drawings and description are to be regarded as illustrative in nature and not restrictive, and like reference numerals designate like elements throughout the specification.

In this specification, redundant description of the same constituent elements is omitted. Also, in this specification, it is to be understood that when one component is referred to as being "connected" or "coupled" to another component, it may be connected or coupled directly to the other component or may be connected or coupled to the other component with another component intervening therebetween.

On the other hand, in this specification, it is to be understood that when one component is referred to as being "connected or coupled directly" to another component, it may be connected or coupled to the other component without another component intervening therebetween.

It is also to be understood that the terminology used herein is only used for the purpose of describing particular embodiments, and is not intended to limit the embodiment. Singular forms are to include plural forms unless the context clearly indicates otherwise.

It will be further understood that terms "comprises" and "have" used in the present specification specify the presence of stated features, numerals, steps, operations, components, parts, or a combination thereof, but do not preclude the presence or addition of one or more other features, numerals, steps, operations, components, parts, or a combination thereof.

Also, as used herein, the term "and/or" includes any plurality of combinations of items or any of a plurality of listed items. In the present specification, "A or B" may include "A", "B", or "A and B".

Figure 1:
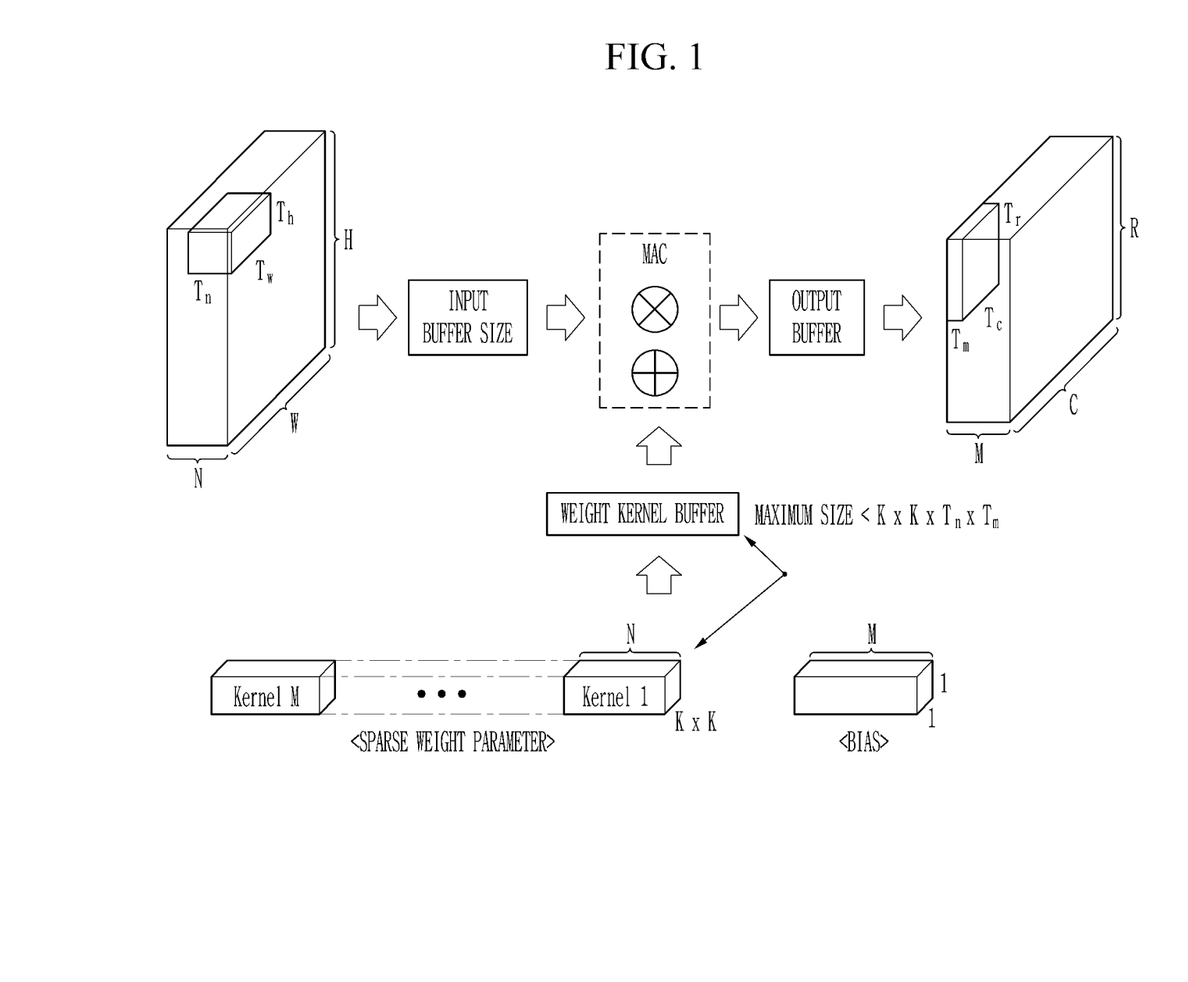
FIG. 1 is a schematic diagram illustrating convolution layers of a convolutional neural network according to an exemplary embodiment.
Figure 2:
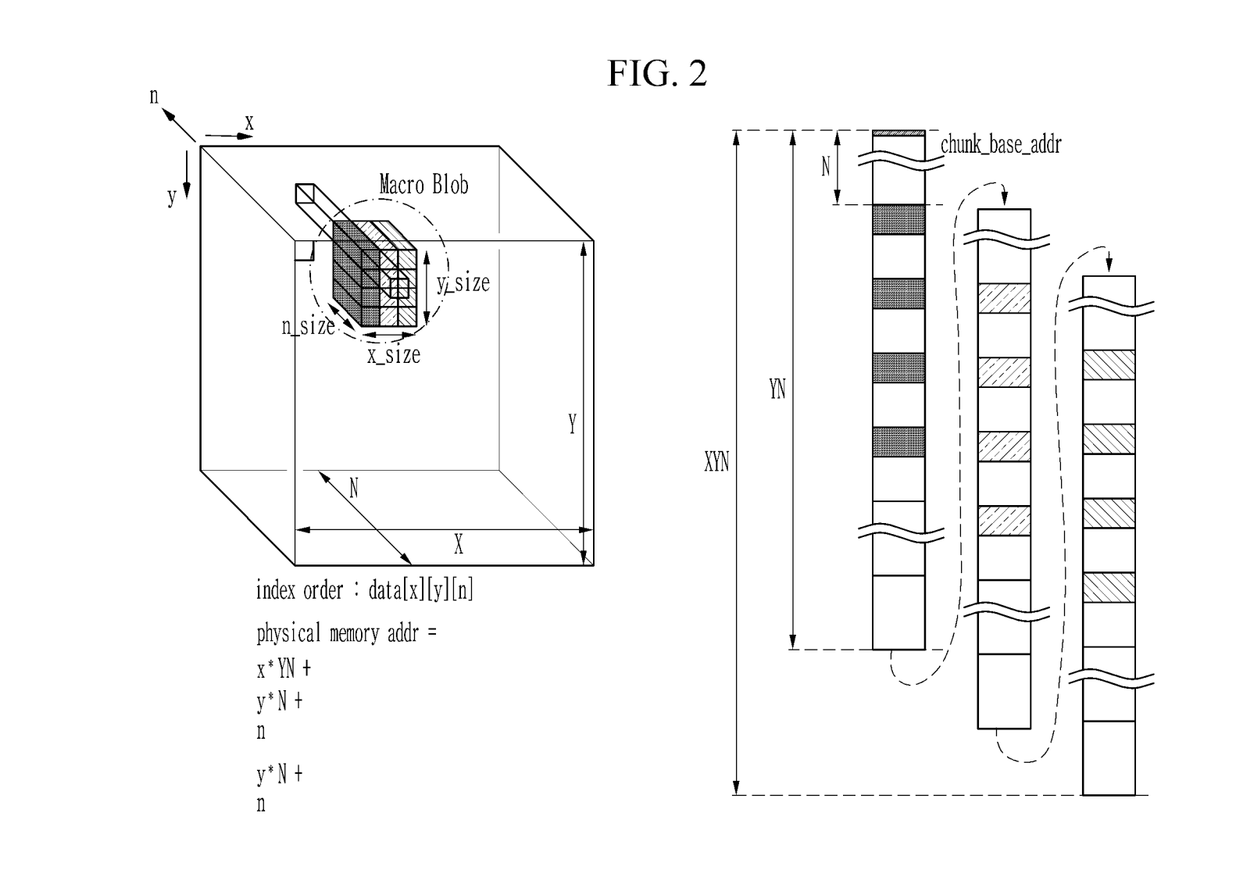
FIG. 2 is a schematic diagram illustrating a memory structure of a neural network according to an exemplary embodiment.

FIG. 1 is a schematic diagram illustrating convolutional layers of a convolutional neural network according to an exemplary embodiment, and FIG. 2 is a schematic diagram illustrating a memory structure of a neural network according to an exemplary embodiment.

Referring to FIG. 1, a convolutional neural network (CNN) may perform a Multiply-ACcumulate (MAC) operation on an input of an input buffer and a weight value of a weighted kernel buffer to determine an output. In FIG. 1, the input buffer may provide inputs of height H, width W, and depth N to the convolutional layer. The output of height R, width C, and depth M may be stored in an output buffer. The size of an input fragment used for the MAC operation may be $T_W \times T_H \times T_N$, and the size of an output fragment output after the MAC operation may be $T_C \times T_R \times T_M$. The size of a kernel filter fragment used for the MAC operations may be K×K.

In an artificial neural network, throughput of operations between an input layer and a hidden layer may be determined depending on an amount of input/output data. Layers have been deepened in VGGnet, GoogLeNet, etc., developed after AlexNet, and accordingly, computational throughput may be determined according to the size of the weight and the input/output layer. In a mobile environment or a field programmable gate array (FPGA) hardware platform, these artificial neural networks are difficult to be implemented because of the limited resources available. Therefore, in order to implement the artificial neural network in a restricted environment such as the mobile environment, a method of excluding a parameter having a low weight from the calculation, a method of sharing parameters having a similar weight in the calculation, or a method of using only a parameter that is actually needed in the calculation may be used. If synaptic parameters of the neural network are sparse, the data size will be greatly reduced, thus reducing the amount of MAC computation, which may enable low-power design. Alternatively, a quantizing method for the data size of the input/output layer and the hidden layer may be used to implement the artificial neural network in the environment. For example, neural network compression techniques such as pruning and quantization may reduce the data size of the neural network operations.

Referring to FIG. 2, data for the operation of the neural network may be stored in the memory, and the neural network may perform the operation on the input after reading the data from the memory. A size of a memory space may be X×Y×N, and the data requested by the neural network may be accessed in units of macro BLOBs (Binary Large Objects). A size of the macro blobs may be n_size× x_size×y_size. A memory control apparatus according to an exemplary embodiment may perform direction settings for an N direction, an X direction, and a Y direction and access the data in the memory based on a blob descriptor of the macro blob. The data read by the memory control apparatus may be stored in a buffer so that the data is used for the MAC operations of the neural networks. In this case, the accesses to the data may be performed discontinuously according to the size of the macro blobs in the N direction, the X direction, and the Y direction. At this time, the memory control apparatus according to an exemplary embodiment may predict accessibility of an address of next data from an address of once accessed data, to improve computational efficiency of the neural network and reduce the throughput of the neural network, and may continuously perform a prefetching process for the data.

Figure 3:
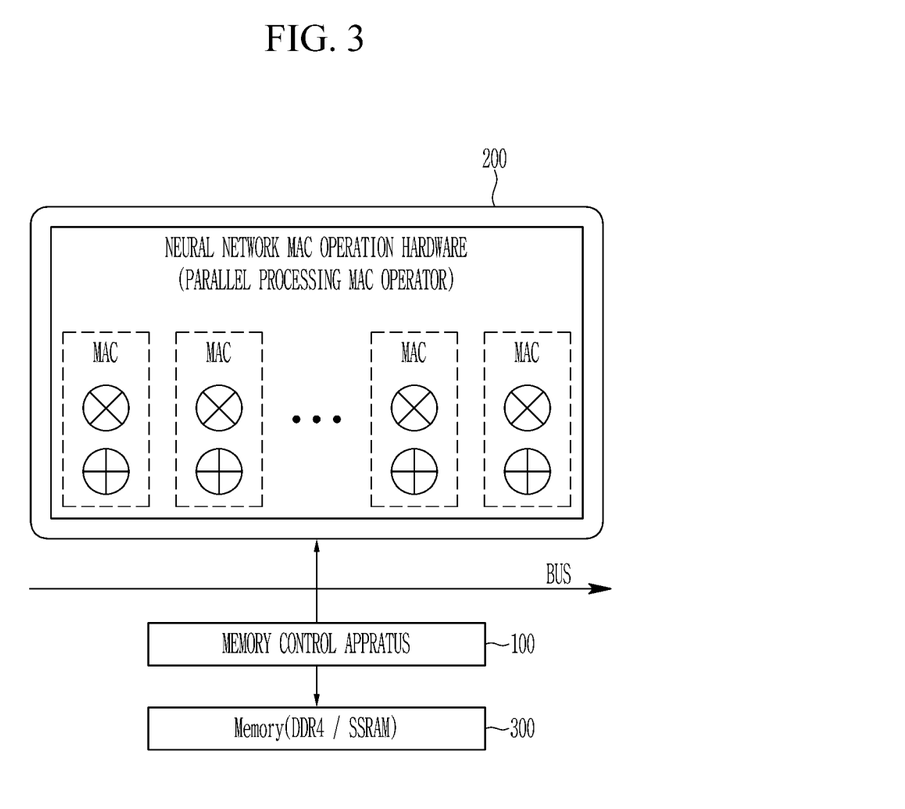
FIG. 3 is a block diagram illustrating a computation system of a neural network according to an exemplary embodiment.

FIG. 3 is a block diagram illustrating a computation system of a neural network according to an exemplary embodiment.

Referring to FIG. 3, a memory control apparatus 100 according to an exemplary embodiment may control a memory 300 and read, from the memory 300, data requested by a neural network operator 200 used in, for example, a deep neural network (DNN). Thereafter, the memory control apparatus 100 may store the read data in a buffer, and the neural network operator 200 may load the data stored in the buffer for calculation. The data (e.g., updated weights values) calculated by the neural network operator 200 may be stored in the memory 300 via the buffer. The neural network operator 200 may be a neural network performing parallel processing multiplier-accumulators (MAC) operations using a plurality of MAC operators. The memory 300 may store weight data for the MAC operation of the neural network. The memory 300 may be, for example, a volatile storage device such as static RAM (SRAM), synchronous static RAM (SSRAM), dynamic RAM (DRAM), synchronous DRAM (SDRAM), or double data rate SDRAM (DDR SDRAM). The memory control apparatus 100 may be connected to the neural network operator 200 through the bus 10. In addition, the neural network operator 200 may use a sparse synapse scheme excluding synapses having a low contribution to the calculation.

In the exemplary embodiment, the neural network operator 200 may perform the MAC operation on the input by using the weighted data transferred from the memory control apparatus 100. The weight data may be predetermined according to a machine learning model of the neural network operator 200 (e.g., ResNet, VGGnet, Googlenet, etc.), and information about the size of the data may be included in the blob descriptor. The blob descriptor according to the exemplary embodiment may be a three-dimensional (3D) blob descriptor. The memory control apparatus 100 according to the exemplary embodiment may determine a memory address and a size of the requested data based on the blob descriptor, and may read the data based on the determined address and size and transmit the read data to the neural network operator 200. When the operation for the data requested by the neural network operator 200 is completed, the memory control apparatus 100 may store the calculated data at an address in the memory based on the blob descriptor. While the data requested by the neural network operator 200 is used during the calculation, the memory control apparatus 100 according to the exemplary embodiment may use a reference prediction table to check information about data to be used for next calculation, and may prefetch the data to be used for the next operation into a prefetch buffer at the time when the operation of the previous data is completed or before the operation of the previous data is completed.

Figure 4:
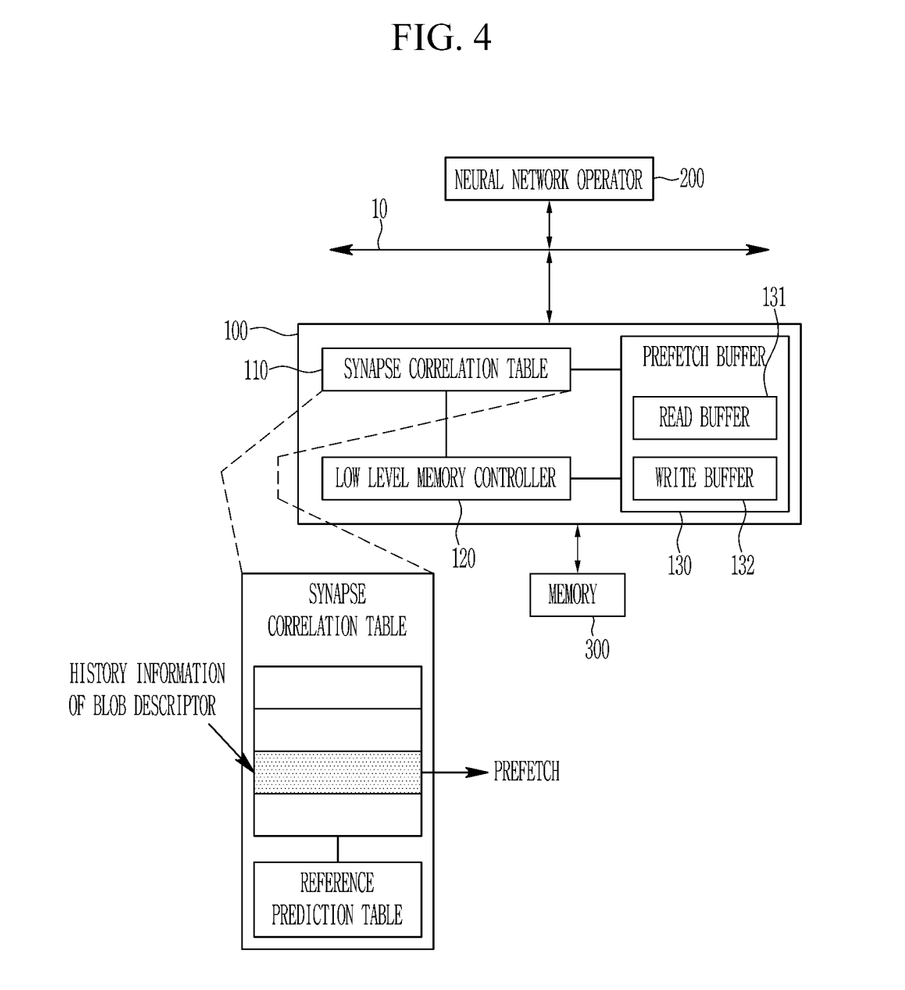
FIG. 4 is a block diagram illustrating a structure of a memory control apparatus according to an exemplary embodiment.

FIG. 4 is a block diagram illustrating a structure of a memory control apparatus according to an exemplary embodiment.

Referring to FIG. 4, a memory control apparatus 100 may include a synapse correlation table 110, a low-level memory controller 120, and a prefetch buffer 130.

The synapse correlation table 110 may be connected to the blob descriptor so that prefetch information of data may be generated using the blob descriptor and the reference prediction table when history information is input. The history information may relate to a pattern of data storage for accessing irregularly stored data. The history information may include blob parameters determined by 3D blob descriptors, a size of continuous data used for execution of microcode (u-code), future data access addresses, and so on. The prefetch information may include a source address (SRCA) of data and a size (nByte) of data to be used in the neural network operator. The source address of the data may be an in-memory address of the data to be used by the neural network operator. The reference prediction table may be determined according to the type of the neural network operator 200. The reference prediction table of the synapse correlation table 110 may include correlations between previously performed accesses for data.

The low-level memory controller 120 may obtain the prefetch information for accessing the data stored in the memory 300 using the synapse correlation table 110, and may read the data from the memory 300 using the obtained prefetch information. The low-level memory controller 120 may read data stored at the source address in the prefetch information from the memory 300 and temporarily keep the read data in the read buffer 131 of the prefetch buffer 130. The low-level memory controller 120 may store the data updated by the neural network operator at a target address in the memory corresponding to the source address.

Figure 5:
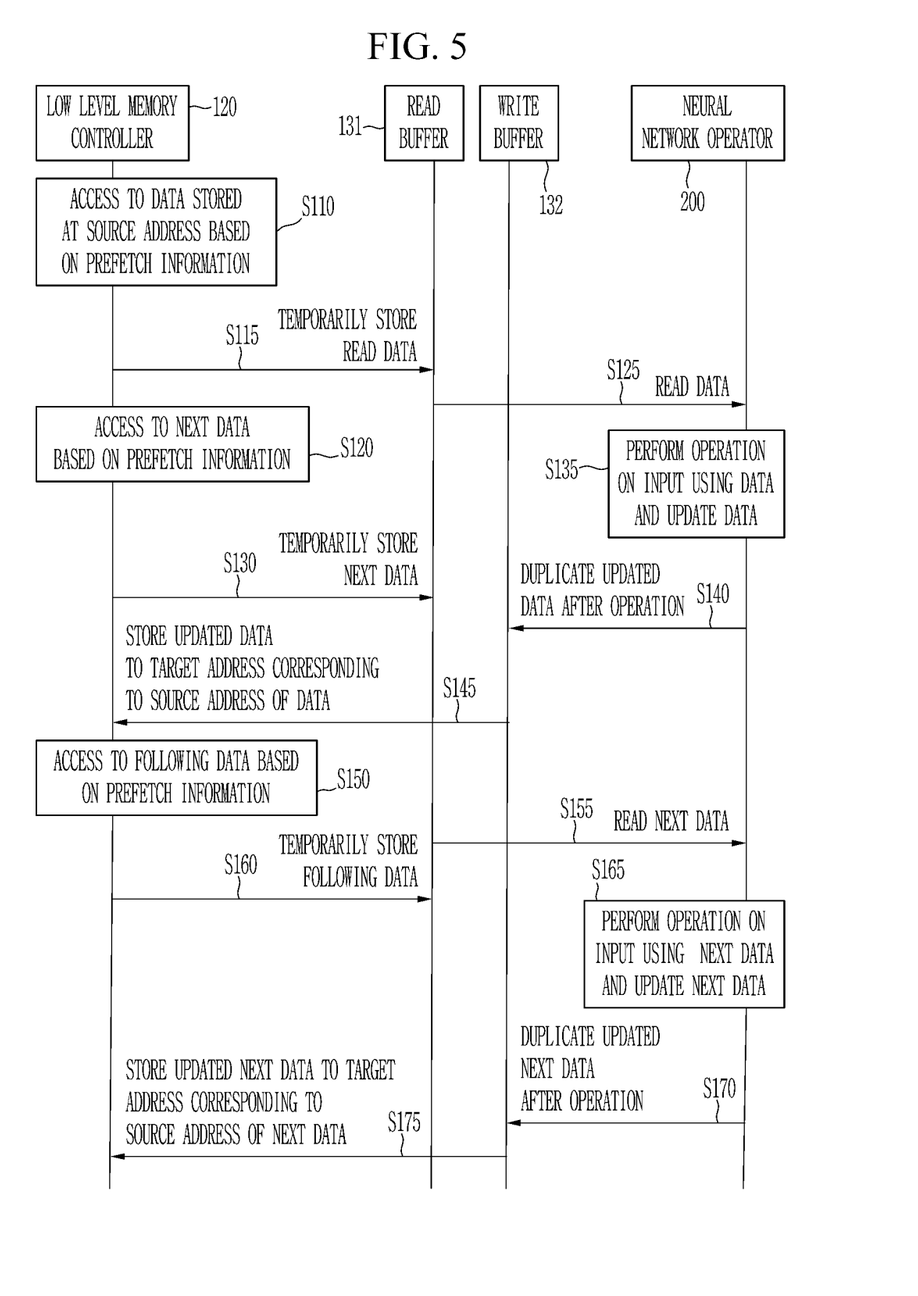
FIG. 5 is a flow chart illustrating a memory controlling method of the memory control apparatus coupled to a deep neural network according to an exemplary embodiment.
Figure 6:
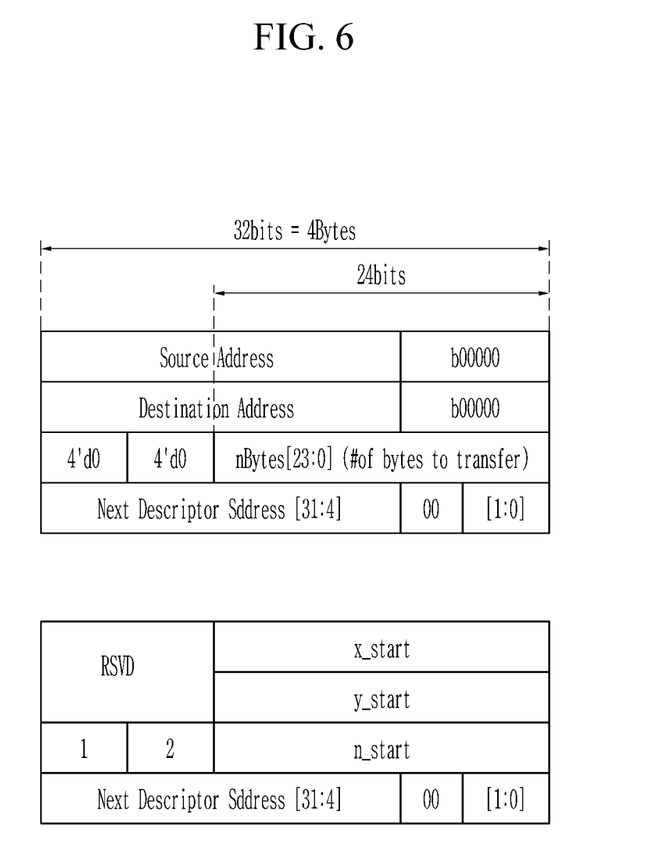
FIG. 6 is a schematic diagram illustrating a blob descriptor according to an exemplary embodiment.
Figure 7:
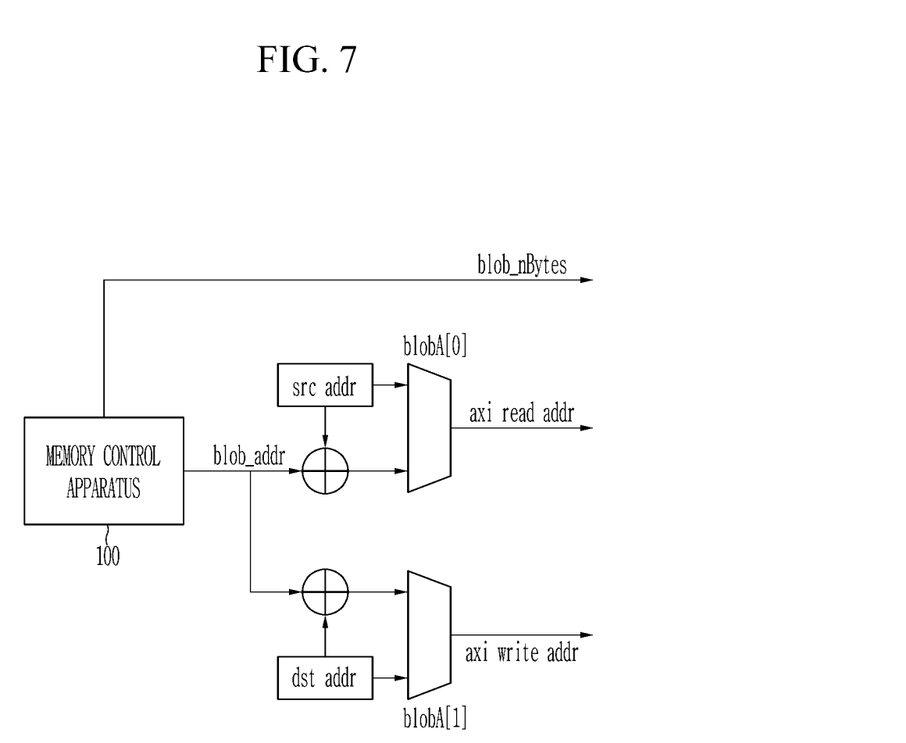
FIG. 7 is a schematic diagram illustrating a data reading/writing method according to an exemplary embodiment.

FIG. 5 is a flowchart illustrating a memory controlling method of the memory control apparatus coupled to a deep neural network according to an exemplary embodiment, FIG. 6 is a schematic diagram illustrating a blob descriptor according to an exemplary embodiment, and FIG. 7 is a schematic diagram illustrating a data reading/writing method according to an exemplary embodiment.

When the history information is input to the synapse correlation table 110 of the memory control apparatus 100, the memory control apparatus 100 may generate prefetch information for accessing data in the memory using the blob descriptor and the reference prediction table. The prefetch information may include first prefetch information including a source address of data to be used in the neural network operator and a size of the data and second prefetch information including a source address of next data and a size of the next data. The memory control apparatus 100 according to an exemplary embodiment may generate a plurality of prefetch information using the blob descriptor and the reference prediction table based on the history information in advance, and seamlessly provide the data to be used during the operations of the neural network operator 200 without waiting time and without interruption by sequentially using the generated plurality of prefetch information.

Referring to FIG. 5, the low-level memory controller 120 may access data stored at the source address in the memory 300 based on the prefetch information (S110), and temporarily store the data read from the source address into the read buffer 131 (S115). Then the low-level memory controller 120 may access the next data stored at the source address in the memory 300 based on the prefetch information (S120), and after the data temporarily stored in the read buffer 131 is transmitted to the neural network operator 200 (S125), the next data read from the source address may be temporarily stored in the read buffer (131) (S130). The next data may be data to be used for the next operation after the previous data is used in the operation by the neural network operator 200. The source address of the data is the in-memory address of the data to be used by the neural network operator, and the source address of the previous data is different from the source address of the next data.

The data accessed by the low-level memory controller 120 may be used during the operation of the neural network operator 200, and may be weights for the operation of the neural network operator 200 or data for execution of the microcode. The reference prediction table according to an exemplary embodiment may be determined according to the type of the neural network operator 200, for example, the type of the DNN model such as ResNet, VGGnet, Googlenet, and so on. The memory control apparatus 100 may generate the prefetch information used to access the data for the operations of the neural network operator 200 by using the blob descriptor and the reference prediction table based on the history information.

The neural network operator 200 may perform the operations on the input by using the data read from the read buffer 131 (S135). The neural network operator 200 may update the data according to the operation result and copy the updated data (e.g., the updated weight data) to the write buffer 132 (S140). The low-level memory controller 120 may store the updated data copied to the write buffer 132 at a target address in the memory (S145). The target address may correspond to the read address of the data and may be included in the blob descriptor.

In order to prepare data to be used for an operation following the next operation of the neural network operator 200, the low-level memory controller 120 may access data following the next data in the memory based on the prefetch information (S150). When the next data prepared in the read buffer 131 is transferred to the neural network operator 200 (S155), the low-level memory controller 120 may prepare the operation following the next operation of the neural network operator 200 by temporarily keeping the data following the next data in the read buffer 131 (S160). According to the exemplary embodiment, the step of S130 may be performed by the low-level memory controller 120 after the step of S125, and may be performed in parallel with the step of S135 and S140. In addition, the neural network operator 200 may perform the step of reading the next data (the step of S155) immediately following the step of reading the previous data (step S125) or may perform the step of S155 in parallel with the steps of S135 to S145. Alternatively, the neural network operator 200 may perform reading of the next data (the step of S155) in parallel while performing the step of copying the updated data to the write buffer (the step of S140).

The neural network operator 200 may perform the next operation on input(s) by using the next data read from the read buffer 131 (S165). The neural network operator 200 may update the next data according to the result of the next operation, and copy the updated next data to the write buffer 132 (S170). Then the low-level memory controller 120 may store the updated next data copied to the write buffer 132 at a target address in the memory (S175), where the target address may correspond to the source address of the next data.

Referring to FIG. 6, the blob descriptor may include an address to which data to be used for the operation is stored (Source Address), an address to which the updated data is to be stored (Destination Address), a size of data to be used during the operation (nByte), and an address of the next blob descriptor (Next Descriptor Address). The blob descriptor may further include information on the direction of reading data from the memory (channel directionality and kernel directionality such as x_start, y_start, n_start). The blob descriptor according to an exemplary embodiment may be compatible with a conventional direct memory access (DMA) scheme, and each blob descriptor may be independent from other blob descriptors. The memory control apparatus 100 according to an exemplary embodiment may determine a next memory address to be accessed, a size of data to be used in a next operation, a reading/writing directions of blob data, and the like based on the blob descriptor. In FIGS. 6 and 7, the source address in the blob descriptor may correspond to 'src_addr', and the destination address may correspond to 'dst_addr'.

Referring to FIG. 7, the memory control apparatus 100 according to the exemplary embodiment may check an address (blob_addr) of the data blob using the blob descriptor (that is, source address (src addr)), and access the source address in the memory by using a specified protocol (for example, axi (Advanced Extensible Interface) protocol). The memory control apparatus 100 may check an address (blob_addr) to which the updated data is to be stored (target address (dst_addr)) by using the blob descriptor, and write the data blob to the target address in the memory using the specified protocol (e.g., axi write addr).

Figure 8:
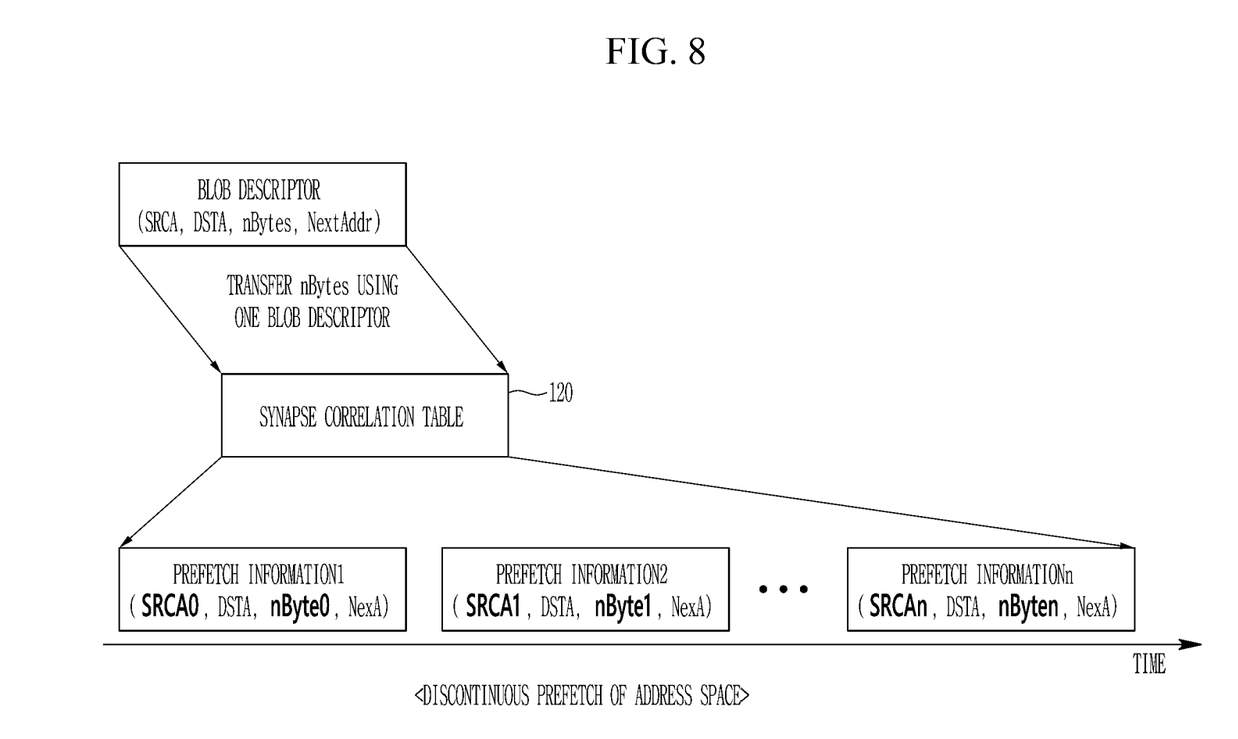
FIG. 8 is a schematic diagram illustrating a discontinuous prefetch method of address space using a synapse correlation table according to an exemplary embodiment.

FIG. 8 is a schematic diagram illustrating a discontinuous prefetch method of address space using a synapse correlation table according to an exemplary embodiment.

Referring to FIG. 8, the blob data of nBytes, which will be used for the operation of the neural network operator in a discontinuous prefetching method of the address space, may be transferred using one 3D blob descriptor. The memory control apparatus 100 may access the memory 300 in the order of prefetch information 1, prefetch information 2, and prefetch information 3. That is, for example, the memory control apparatus 100 may access data in the memory using the prefetch information 1, then access next data in the memory using the prefetch information 2, and finally access $n^{th}$ data in the memory using the prefetch information n.

As described above, according to an exemplary embodiment, since the address and size of the data to be used for the neural network operator based on the prefetch information are accurately predicted, the data loading time may be reduced and the computational efficiency of the neural network operator may be greatly improved.

Figure 9:
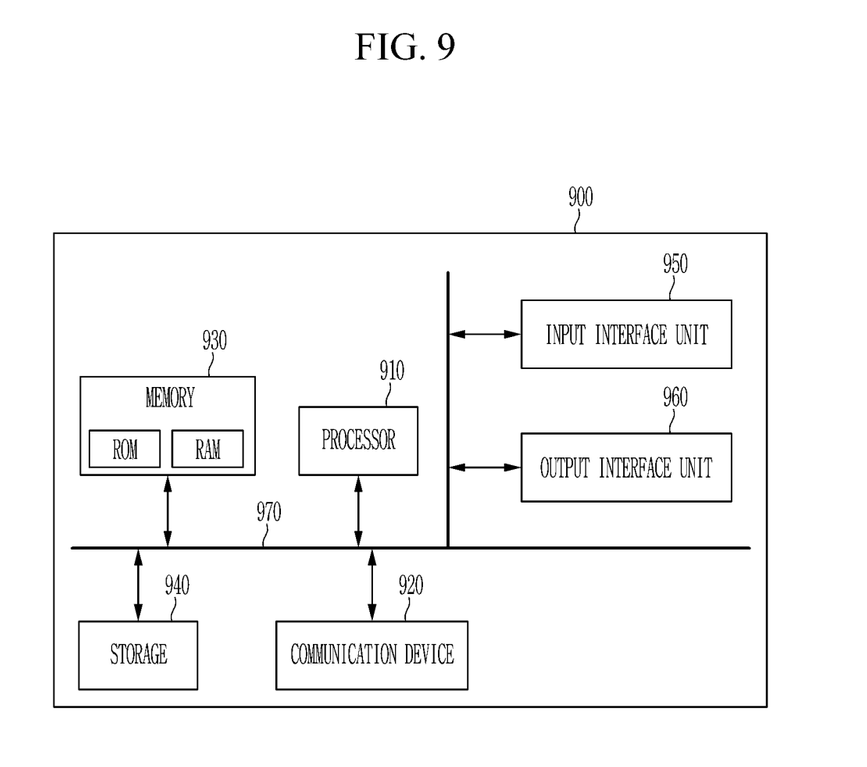
FIG. 9 is a block diagram illustrating a memory control apparatus according to another exemplary embodiment.

FIG. 9 is a block diagram illustrating an apparatus for generating a virtual viewpoint image according to another exemplary embodiment.

The apparatus for generating a virtual viewpoint image according to another exemplary embodiment may be implemented as a computer system, for example a computer readable medium. Referring to FIG. 9, a computer system 900 may include at least one of processor 910, a memory 930, an input interface 950, an output interface 960, and storage 940. The computer system 900 may also include a communication unit 920 coupled to a network. The processor 910 may be a central processing unit (CPU) or a semiconductor device that executes instructions stored in the memory 930 or storage 940. The memory 930 and the storage 940 may include various forms of volatile or non-volatile storage media. For example, the memory may include read only memory (ROM) 931 or random access memory (RAM) 932.

In the exemplary embodiment of the present disclosure, the memory may be located inside or outside the processor, and the memory may be coupled to the processor through various means already known. Thus, the embodiments may be embodied as a computer-implemented method or as a non-volatile computer-readable medium having computer-executable instructions stored thereon.

In the exemplary embodiment, when executed by a processor, computer-readable instructions may perform the method according to at least one aspect of the present disclosure. The communication unit 920 may transmit or receive a wired signal or a wireless signal.

On the contrary, the embodiments are not implemented only by the apparatuses and/or methods described so far, but may be implemented through a program realizing the function corresponding to the configuration of the embodiment of the present disclosure or a recording medium on which the program is recorded.

Such an embodiment can be easily implemented by those skilled in the art from the description of the embodiments described above. Specifically, methods (e.g., network management methods, data transmission methods, transmission schedule generation methods, etc.) according to embodiments of the present disclosure may be implemented in the form of program instructions that may be executed through various computer means, and be recorded in the computer-readable medium.

The computer-readable medium may include program instructions, data files, data structures, and the like, alone or in combination. The program instructions to be recorded on the computer-readable medium may be those specially designed or constructed for the embodiments of the present disclosure or may be known and available to those of ordinary skill in the computer software arts.

The computer-readable recording medium may include a hardware device configured to store and execute program instructions. For example, the computer-readable recording medium can be any type of storage media such as magnetic media like hard disks, floppy disks, and magnetic tapes, optical media like CD-ROMs, DVDs, magneto-optical media like floptical disks, and ROM, RAM, flash memory, and the like.

Program instructions may include machine language code such as those produced by a compiler, as well as high-level language code that may be executed by a computer via an interpreter, or the like.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software. The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers.

A computer program(s) may be written in any form of a programming language, including compiled or interpreted languages and may be deployed in any form including a stand-alone program or a module, a component, a subroutine, or other units suitable for use in a computing environment.

A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks.

Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium.

A processor and a memory may be supplemented by, or integrated into, a special purpose logic circuit. The processor may run an operating system (08) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements.

For example, a processor device may include multiple processors or a processor and a controller. In addition, different processing configurations are possible, such as parallel processors. Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment.

Features described in the specification in the context of individual example embodiments may be implemented as a combination in a single example embodiment. In contrast, various features described in the specification in the context of a single example embodiment may be implemented in multiple example embodiments individually or in an appropriate sub-combination.

Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

While this disclosure has been described in connection with what is presently considered to be practical example embodiments, it is to be understood that this disclosure is not limited to the disclosed embodiments, but, on the contrary, is intended to cover various modifications and equivalent arrangements included within the spirit and scope of the appended claims.

What is claimed is:

1. A method for controlling a memory from which data is transferred to a neural network processor, the method comprising:
   generating prefetch information of data by using a blob descriptor and a reference prediction table after history information is input;
   reading the data in the memory based on the pre-fetch information and temporarily archiving read data in a prefetch buffer; and
   accessing next data in the memory based on the prefetch information and temporarily archiving the next data in the prefetch buffer after the data is transferred to the neural network from the prefetch buffer.

2. The method of claim 1, wherein the prefetch information includes first prefetch information about a source address of the data and a size of the data and second prefetch information about a source address of the next data and a size of the next data.

3. The method of claim 2, wherein the reading the data in the memory based on the prefetch information and temporarily archiving read data in a prefetch buffer comprises
   reading the data in the memory based on the source address in the first prefetch information.

4. The method of claim 3, further comprising:
   storing, after data updated based on operation using the data is archived in the prefetch buffer, updated data in the memory according to a source address of the data.

5. An apparatus for controlling a memory from which data is transferred to a neural network processor, the apparatus comprising:
   a synapse correlation table configured to include a reference prediction table used for generating prefetch information of data in cooperation with a blob descriptor after history information is input;
   a low level memory controller configured to read the data in the memory based on the prefetch information and read next data following the data in the memory based on the prefetch information; and
   a prefetch buffer configured to temporarily store the data until the data read by the low level memory controller is transferred to the neural network processor and temporarily store the next data after the data is transferred to the neural network processor.

6. The apparatus of claim 5, wherein the prefetch information includes first prefetch information about a source address of the data and a size of the data and second prefetch information about a source address of the next data and a size of the next data.

7. The apparatus of claim 6, wherein the low level memory controller is further configured to read the data in the memory based on the source address of the data included in the first prefetch information and read the next data in the memory based on the source address of the next data included in the second prefetch information.

8. The apparatus of claim 7, wherein the prefetch buffer includes a read buffer and a write buffer and the prefetch buffer is configured to temporarily store the data in the read buffer and store the next data in the read buffer after the data is transferred to the neural network processor.

9. The apparatus of claim 8, wherein the prefetch buffer is further configured to temporarily store, when data updated based on operation using the data is received from the neural network processor, updated data in the write buffer.

10. The apparatus of claim 9, wherein the low level memory controller is further configured to store, when the updated data is temporarily stored in the write buffer, the updated data in the memory according to a target address corresponding to the source address of the data.

11. A system for operating a neural network, the system comprising:
    a neural network processor including a plurality of MAC operator,
    a memory, and
    a memory controller configured to transfer data stored in the memory to the neural network processor and store data updated by the neural network processor in the memory,
    wherein the memory controller is configured to generate prefetch information of data by using a synapse correlation table and a blob descriptor based on history information, read the data in the memory based on the prefetch information, and read next data following the data in the memory based on the prefetch information for next operation of the neural network processor while the data is used by the neural network processor.

12. The system of claim 11, wherein the prefetch information includes first prefetch information about a source address of the data and a size of the data and second prefetch information about a source address of the next data and a size of the next data.

13. The system of claim 12, wherein the memory controller is further configured to access the source address of the data included in the first prefetch information to transfer the data to the neural network processor and access the source address of the next data included in the second prefetch information to transfer the next data to the neural network processor.

14. The system of claim 12, wherein the memory controller is further configured to store the updated data in the memory according to a target address corresponding to the source address of the data when the updated data is archived in a prefetch buffer.

* * * * *